US012651897B2

(12) United States Patent
Porter et al.

(10) Patent No.: US 12,651,897 B2
(45) Date of Patent: Jun. 9, 2026

(54) RESTORATION WITH LEARNING

(71) Applicant: S&C Electric Company, Chicago, IL (US)

(72) Inventors: David Glenn Porter, East Troy, WI (US); Christine Elizabeth McNeil, West Allis, WI (US)

(73) Assignee: S&C Electric Company, Chicago, IL (US)

( * ) Notice: Subject to any disclaimer, the term of this patent is extended or adjusted under 35 U.S.C. 154(b) by 152 days.

(21) Appl. No.: 18/898,753

(22) Filed: Sep. 27, 2024

(65) Prior Publication Data

US 2025/0112456 A1      Apr. 3, 2025

Related U.S. Application Data

(60) Provisional application No. 63/586,015, filed on Sep. 28, 2023.

(51) Int. Cl.
H02H 7/00          (2006.01)
H02H 7/22          (2006.01)

(52) U.S. Cl.
CPC ..................................... H02H 7/22 (2013.01)

(58) Field of Classification Search
CPC ........................................................ H02H 7/22
See application file for complete search history.

(56) References Cited

U.S. PATENT DOCUMENTS

| | | | | |
|---|---|---|---|---|
| 7,154,722 B1 * | 12/2006 | Stoupis | ..................... | H02H 3/06 |
| | | | | 307/29 |
| 7,860,615 B2 * | 12/2010 | Nelson | ................... | G06Q 50/06 |
| | | | | 361/64 |
| 7,916,627 B2 * | 3/2011 | Berkowitz | ............... | H02H 7/30 |
| | | | | 370/242 |
| 11,784,500 B1 * | 10/2023 | Richter | ..................... | H02J 7/64 |
| | | | | 361/1 |
| 12,266,925 B2 * | 4/2025 | Meisinger, Sr. | ......... | H02H 3/06 |
| 2021/0091558 A1 * | 3/2021 | Meisinger | ................ | H02H 7/22 |
| 2024/0332953 A1 * | 10/2024 | Harirchi | ................... | H02H 3/40 |
| 2024/0377449 A1 * | 11/2024 | Porter | .................... | G01R 31/62 |

* cited by examiner

*Primary Examiner* — Stephen W Jackson

(57) ABSTRACT

A system and method for isolating a fault in a power distribution network. The network includes a power line, a plurality of transformers electrically coupled to and positioned along the power line, and a recloser coupled to the power line. Each transformer has a unique address identifying the transformer and includes a source side switching device at an upstream side of the transformer and a load side switching device at a downstream side of the transformer. The method includes learning the address by each transformer of its immediate neighbor transformers, detecting overcurrent by some of the switching devices as a result of the fault, detecting loss of voltage by some of the switching devices and sending clear to close messages to selectively open and close certain ones of the switching devices using the transformer addresses to limit the number of switching devices that are operated and to isolate the fault.

20 Claims, 1 Drawing Sheet

RESTORATION WITH LEARNING

CROSS-REFERENCE TO RELATED APPLICATION

This application claims the benefit of priority from the U.S. Provisional Application No. 63/586,015, filed on Sep. 28, 2023, the disclosure of which is hereby expressly incorporated herein by reference for all purposes.

BACKGROUND

Field

The present disclosure relates generally to a system and method for providing fault isolation in a power distribution network and, more particularly, to a system and method for providing fault isolation in a power distribution network that includes a series of distribution transformers.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down to a medium voltage for distribution. The substations provide the medium voltage power to three-phase feeders including three single-phase feeder lines that carry the same current but are 120° apart in phase. three-phase and single-phase lateral lines are tapped off of the feeder that provide the medium voltage to various distribution transformers, where the voltage is stepped down to a low voltage and is provided to loads, such as homes, businesses, etc.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow to significantly increase, for example, many times above the normal current, along the fault path. This amount of current causes the electrical lines to significantly heat up and possibly melt, and also could cause mechanical damage to various components in the network. These faults are often transient or intermittent faults as opposed to a persistent or bolted fault, where the thing that caused the fault is removed a short time after the fault occurs, for example, a lightning strike. In such cases, the distribution network will almost immediately begin operating normally after a brief disconnection from the source of power.

Power distribution networks of the type referred to above typically include switching devices, breakers, reclosers, current interrupters, etc. that control the flow of power throughout the network. Standalone pad mounted and underground switchgear including electrical disconnect switches, fuses and/or circuit breakers used to control, protect and isolate electrical equipment are often employed to de-energize equipment to allow work to be done and to clear faults. Reclosers and other types of fault interrupting devices are often provided as protection devices on utility poles and other locations. These reclosers typically detect the current and/or voltage on the line to monitor current flow and have controls that indicate problems with the network circuit, such as detecting a high current fault event. If such a high fault current is detected the recloser is opened in response thereto, and then after a short delay is closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open and it may drop out of its mounting or provide another form of indication that it is locked open, where the time between detection tests may increase after each test.

Some power distribution networks may employ underground single-phase lateral circuits that feed residential and commercial customers. Often times these circuits are configured in a loop and fed from power sources at both ends, where an open circuit location in the loop isolates the two power sources. Transformers are dispersed along the loop circuit that each service loads, where the open circuit location is typically provided at one of the transformers. A single-phase power line is coupled to the primary coil in each transformer so that current flows to the primary coils along the loop circuit.

It has been proposed in the art to provide a switching device, sometimes referred to as a bushing well interrupter (BWI), at the source side and the load side of each transformer in these underground networks between the primary coil and the line that includes, for example, a vacuum interrupter. The two switching devices for each transformer can be controlled by a common control unit. The network may employ a fault isolation and protection scheme where faults are detected and the switching devices nearest both sides of the fault are opened to isolate the faulted line segment. In one known fault isolation and protection scheme for these circuits, the transformer control units are in communication with each other through powerline communications (PLC), where messages are transmitted between and among the transformers on the line that is used for power transmission.

SUMMARY

The following discussion discloses and describes a system and method for providing fault isolation in a power distribution network. The network includes a power line, a plurality of distributed electrical devices electrically coupled to and positioned along the power line, and a fault interrupting device coupled to the power line, where each electrical device has a unique address identifying the electrical device and includes a source side switching device at an upstream side of the electrical device and a load side switching device at a downstream side of the electrical device. The method includes learning the address by each electrical device of its immediate neighbor electrical devices, detecting overcurrent in the network from the fault by the fault interrupting device and all of the electrical devices positioned along a fault path between the fault interrupting device and the fault, and interrupting the overcurrent by opening the fault interrupting device. The method further includes detecting loss of voltage when the fault interrupting device opens by the electrical devices along the fault path, detecting loss of voltage when the fault interrupting device opens by the electrical devices that are downstream of the fault, sending a clear to close overcurrent message from each electrical device along the fault path that detected overcurrent followed by loss of voltage to its immediate upstream electrical device using the address of the immediate upstream electrical device while the fault interrupting device is open, and sending a clear to close message from each electrical device downstream of the fault that did not detect overcurrent but detected loss of voltage to its immediate downstream electrical device using the address of the immediate downstream electrical device while the fault interrupting device is open. The method opens the load side switching device of the electrical device that detected overcurrent and loss of voltage, but did not receive a clear to close overcurrent message, addressed to it from its downstream neighbor electrical device, opens the source side switching device of the electrical device that that did not detect overcurrent but detected loss of voltage, and did not receive a clear to close message from its upstream neighbor electrical device, and closes the fault interrupting device after a certain delay that is after the load side switching device is opened.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for providing fault isolation and power restoration in a power distribution network that includes a series of distribution transformers that each have a load side switching device and a source side switching device, where the method causes the transformers to learn who their neighbor transformers are to reduce the number of opening and closing operations of the switching devices when providing fault isolation is merely exemplary in nature, and is in no way intended to limit the invention or its applications or uses. For example, as mentioned, the system and method have particular application for use in an underground loop circuit. However, the system and method may have other applications.

Figure 1:
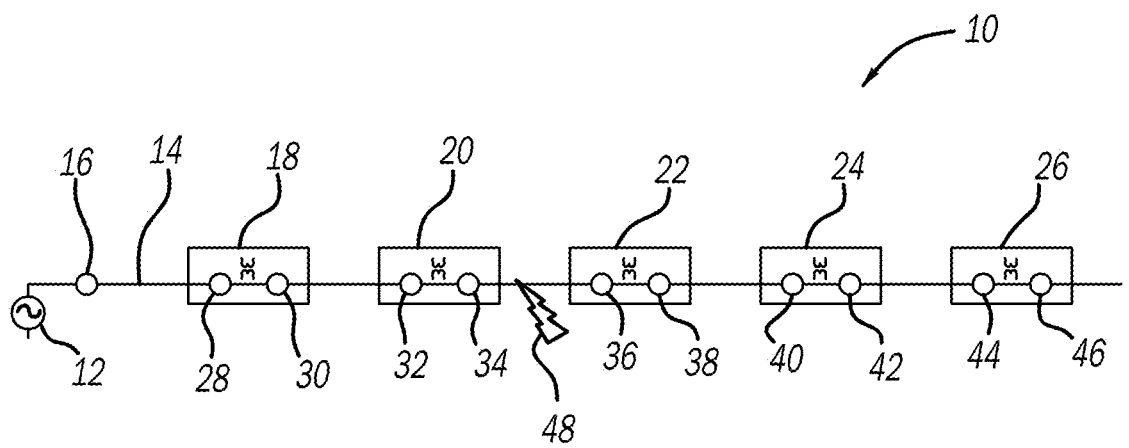
FIG. 1 is a simplified schematic diagram of an underground power distribution network including a series of transformers each having a source side and a load side switching device.

FIG. 1 is a simplified schematic diagram of a power distribution network 10 and can be, for example, part of an underground loop circuit that is fed with power from both ends by power sources, for example, a three-phase feeder coupled to a substation, represented here by power source 12. The network 10 includes a power distribution power line 14, a recloser 16, for example, a single-phase, self-powered recloser, on the line 14 at the head end of the network 10, and five transformers 18, 20, 22, 24 and 26 coupled along the line 14. Each transformer 18-26 includes a source side towards the source of power, i.e., the power source 12, and a load side towards a normally open point (44 below) in the line 14. The transformer 18 includes source side and load side switching devices 28 and 30, respectively, the transformer 20 includes source side and load side switching devices 32 and 34, respectively, the transformer 22 includes source side and load side switching devices 36 and 38, respectively, the transformer 24 includes source side and load side switching devices 40 and 42, respectively, and the transformer 26 includes a normally open (NO) switching device 44 and a normally closed (NC) switching device 46. The switching device 44 is normally open to provide electrical isolation between the end power sources. The switching devices 28-46 can be any fault interrupting device suitable for the purposes discussed herein, such as the BWIs referred to above.

Figure 2:
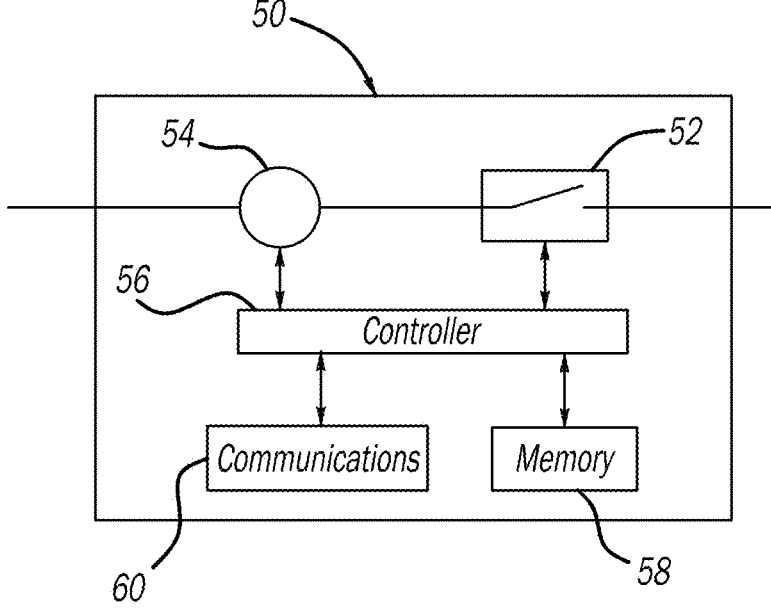
FIG. 2 is a simplified block diagram of one of the switching devices.

FIG. 2 is a simplified schematic block diagram of a switching device 50 intended to be a non-limiting general representation of either the recloser 16 or one of the switching devices 28-46. The device 50 includes a switch 52, for example, a vacuum interrupter, a sensor 54 that is intended to represent a voltage sensor, a current sensor or a shared current sensor between load side and source side switching devices, a controller 56, a memory 58, and a communications device 60, for example, a PLC communications device, where the memory 58 stores executable code to perform the various calculations and operations discussed herein.

The network 10 can employ a fault isolation and protection scheme that generally operates as follows, and is referred to herein as the base case fault isolation process. If a fault 48 occurs in the line segment between, for example, the transformers 20 and 22, the recloser 16 and the transformers 18 and 20 along the fault path will detect overcurrent, and the transformers 22, 24 and 26 will detect loss of or sagging voltage, but no overcurrent. The recloser 16 will open as a result of the overcurrent and remain open, for example, for five seconds. During this time, the transformers 18 and 20 see loss of voltage and record an overcurrent event and the transformers 22 and 24 and the source side of the transformer 26 see loss of voltage. When the recloser 16 closes when performing the reclosing operation, and assuming the fault 48 is still there, the recloser 16 and the transformers 18 and 20 again will detect overcurrent and the transformers 22 and 24 again will detect sagging or loss of voltage. The recloser 16 will open again, and since the transformers 18 and 20 saw overcurrent a second time followed by loss of voltage, they will open their load side switching devices 30 and 34, and will both send clear to close over current PLC messages upstream towards the source 12.

The PLC messages discussed herein that are sent by a certain switching device in an upstream or downstream direction are generally only received by the adjacent transformer because of open switching devices and/or message signal strength limitations. The PLC message from the transformer 20 will be sent from its source side and the message is received at the load side of the transformer 18. Since the transformer 18 received the clear to close overcurrent message, it knows that the fault 48 is downstream of the transformer 20, and thus will close its load side switching device 30 while the recloser 16 is still open. In addition as a result of receiving the PLC messages with the address of the sending transformer, where the receiving transformer acknowledges the sending transformer with its address so that the transformers 18 and 20 know that they are neighbors and can use that knowledge when returning to normal operation. The transformer 20 did not receive a clear to close overcurrent message since the fault 48 is not downstream of the transformer 22, and so it keeps the switching device 34 open. The recloser 16 closes again and since the switching device 34 is open, the recloser 16 does not detect overcurrent and remains closed.

After a certain time period that the transformers 22 and 24 detect loss of voltage with no overcurrent events, the transformers 22 and 24 will open their source side switching devices 36 and 40 and send clear to close PLC messages downstream away from the source 12 with their address. When the transformers 24 and 26 received the clear to close message they will acknowledge the message with their address, and they know that a transformer, here the transformers 22 and 24, respectively, is between them and the loss of voltage caused by the fault 48, and thus the transformer 24 will close the switching device 40 and the transformer 26 will close the normally open switching device 44. The transformer 22 did not receive a clear to close message from an upstream transformer so it keeps the switching device 36 open. Thus, the fault 48 is isolated between the open switching devices 34 and 36, and the transformers 22 and 24 now receive power from the source (not show) at the opposite end of the loop circuit. In addition as a result of receiving the PLC messages with the address of the sending and receiving transformers, the transformers 22 and 24 know that they are neighbors and the transformers 24 and 26 know they are neighbors, and can use that knowledge when returning to normal operation.

Once the fault 48 is removed, the network 10 can be returned to its normal configuration. The first step is to close the switching device 34 at the load side of the transformer 20. When the transformer 22 sees the voltage return at the switching device 36 at its source side and is sure that the source is good, the transformer 22 sends a return to normal message to the transformer 26. In response thereto, the transformer 26 opens the switching device 44 to its normally open position and the transformer 22 sees the loss of voltage and closes the switching device 36 at its source side, thus returning the network 10 to normal operation.

In the base case fault isolation scheme discussed above the switching device 30 opened and then closed and the switching device 40 opened and then closed. Reducing the switching of the devices during the fault isolation and power restoration process is desirable because it minimizes the operations required to get to the restored system, which saves energy and maximizes the life of the equipment. Since the switching devices send their address with the messages to their neighboring switching device, this information can be used to reduce the number of switching occurrences during the fault isolation process, as will be discussed below. If a clear to close message is received by a transformer, the transformer will not open a switching device to create an individual segment, rather the addresses are used to communicate over the segment. If a message is received for a different segment, the message is ignored. If the expected message from a known neighbor is not heard, the control will proceed with the restoration process without the neighbor learning as discussed above. If a transformer or transformer control is replaced after its address is known by its neighbors, the fault isolation process goes back to the base case fault isolation scheme until the new address is learned.

For the fault 48 discussed above, and after the transformers 18-26 have sent previous messages to each other and have learned the address of their neighbor transformer, for example, from a previous fault isolation and power restoration or loss of voltage process, when the fault 48 occurs the transformers 18 and 20 will detect overcurrent, the transformers 22, 24 and 26 will detect sagging voltage, but no overcurrent, and the recloser 16 will open as a result of the overcurrent in the same manner as discussed above. However, during this time that the recloser 16 is open, the transformer 20 sends a clear to close overcurrent PLC message to the transformer 18, the transformer 22 sends a clear to close PLC message to the transformer 24, and the transformer 24 sends a clear to close PLC message to the transformer 26. The transformers that receive a PLC message, send a return message acknowledging the received message. If for some reason a transformer does not receive the PLC message, it will operate in the manner discussed above. When the recloser 16 closes, the recloser 16 and the transformers 18 and 20 again will detect overcurrent and the transformers 22 and 24 again will detect sagging or loss of voltage. The recloser 16 will open again, and since the transformer 20 saw overcurrent a second time followed by a loss of voltage, it will open its load side switching device 34. However, the transformer 18 does not open its load side switching device 30 because it previously received the clear to close overcurrent PLC message and knows that the fault 48 is downstream of the transformer 20. The recloser 16 closes again and since the switching device 34 is open, the recloser 16 does not detect overcurrent and the recloser 16 remains closed.

After a certain time period that the transformers 22 and 24 detect loss of voltage with no overcurrent events, the transformer 22 opens its source side switching device 36, and since the transformer 24 previously received the clear to close message from the transformer 22 it doesn't open its source side switching device 40, as was the case discussed above. The transformer 26 then closes the normally open switching device 44 because it previously received the clear to close message from the transformer 24. The same process for returning the network 10 to normal operation discussed above can be employed.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for isolating a fault in a power distribution network, the network including a power line, a plurality of transformers electrically coupled to and positioned along the power line, and a recloser coupled to the power line, each transformer has a unique address identifying the transformer and includes a source side switching device at an upstream side of the transformer and a load side switching device at a downstream side of the transformer, wherein one of the switching devices in the network is a normally open switching device, the method comprising:

learning the address by each transformer of its immediate neighbor transformers;

detecting overcurrent in the network from the fault by the recloser and all of the transformers positioned along a fault path between the recloser and the fault;

interrupting the overcurrent by opening the recloser;

detecting loss of voltage when the recloser opens by the transformers along the fault path;

detecting loss of voltage when the recloser opens by the transformers that are downstream of the fault and upstream of the normally open switching device;

sending a clear to close overcurrent message from each transformer along the fault path that detected overcurrent followed by loss of voltage to its immediate upstream transformer using the address of the immediate upstream transformer while the recloser is open;

sending a clear to close message from each transformer between the fault and the normally open switching device that did not detect overcurrent but detected loss or sagging voltage to its immediate downstream transformer using the address of the immediate downstream transformer after a certain time period;

opening the load side switching device of the transformer that detected overcurrent and loss of voltage, but did not receive a clear to close overcurrent message;

opening the source side switching device of the transformer that did not detect overcurrent but detected loss or sagging voltage, and did not receive a clear to close message; and closing the recloser after the load side switching device has opened.

2. The method according to claim 1 further comprising closing the normally open switching device after the load side and the source side switching devices have opened.

3. The method according to claim 1 wherein sending the messages includes sending the messages on the power line.

4. The method according to claim 1 wherein the power distribution network is part of an underground power distribution network.

5. The method according to claim 1 wherein the switching devices are vacuum interrupters.

6. The method according to claim 1 wherein learning the address by each transformer occurs during an earlier fault isolation and/or loss of voltage procedure.

7. The method according to claim 1 wherein if a transformer does not know its neighbor transformers address it will revert to a default fault isolation procedure.

8. The method according to claim 1 wherein the recloser is a single-phase, self-powered recloser.

9. A method for isolating a fault in a power distribution network, the network including a power line, a plurality of distributed electrical devices electrically coupled to and positioned along the power line, and a fault interrupting device coupled to the power line, each electrical device has a unique address identifying the electrical device and includes a source side switching device at an upstream side of the electrical device and a load side switching device at a downstream side of the electrical device, the method comprising:

learning the address by each electrical device of its immediate neighbor electrical devices;

detecting overcurrent in the network from the fault by the fault interrupting device and all of the electrical devices positioned along a fault path between the fault interrupting device and the fault;

interrupting the overcurrent by opening the fault interrupting device;

detecting loss of voltage when the fault interrupting device opens by the electrical devices along the fault path;

detecting loss of voltage when the fault interrupting device opens by the electrical devices that are downstream of the fault;

sending a clear to close overcurrent message from each electrical device along the fault path that detected overcurrent followed by loss of voltage to its immediate upstream electrical device using the address of the immediate upstream electrical device while the fault interrupting device is open;

sending a clear to close message from each electrical device downstream of the fault that did not detect overcurrent but detected loss or sagging voltage to its immediate downstream electrical device using the address of the immediate downstream electrical device after a certain time period;

opening the load side switching device of the electrical device that detected overcurrent and loss of voltage, but did not receive a clear to close overcurrent message;

opening the source side switching device of the electrical device that that did not detect overcurrent but detected loss or sagging voltage, and did not receive a clear to close message; and closing the fault interrupting device after the load side switching device has opened.

10. The method according to claim 9 further comprising closing a normally open switching device after the load side and the source side switching devices have opened.

11. The method according to claim 9 wherein sending the messages includes sending the messages on the power line.

12. The method according to claim 9 wherein the power distribution network is part of an underground power distribution network and the electrical devices are transformers.

13. The method according to claim 9 wherein the switching devices are vacuum interrupters.

14. The method according to claim 9 wherein learning the address by each electrical device occurs during an earlier fault isolation or loss of voltage procedure.

15. The method according to claim 9 wherein if an electrical device does not know its neighbor electrical device's address it will revert to a default fault isolation procedure.

16. A system for isolating a fault in a power distribution network, the network including a power line, a plurality of distributed electrical devices electrically coupled to and positioned along the power line, and a fault interrupting device coupled to the power line, each electrical device has a unique address identifying the electrical device and includes a source side switching device at an upstream side of the electrical device and a load side switching device at a downstream side of the electrical device, the system comprising components and elements for:

learning the address by each electrical device of its immediate neighbor electrical devices;

detecting overcurrent in the network from the fault by the fault interrupting device and all of the electrical devices positioned along a fault path between the fault interrupting device and the fault;

interrupting the overcurrent by opening the fault interrupting device;

detecting loss of voltage when the fault interrupting device opens by the electrical devices along the fault path;

detecting loss of voltage when the fault interrupting device opens by the electrical devices that are downstream of the fault;

sending a clear to close overcurrent message from each electrical device along the fault path that detected overcurrent followed by loss of voltage to its immediate upstream electrical device using the address of the immediate upstream electrical device while the fault interrupting device is open;

sending a clear to close message from each electrical device downstream of the fault that did not detect overcurrent but detected loss or sagging voltage to its immediate downstream electrical device using the address of the immediate downstream electrical device after a certain time period;

opening the load side switching device of the electrical device that detected overcurrent and loss of voltage, but did not receive a clear to close overcurrent message;

opening the source side switching device of the electrical device that that did not detect overcurrent but detected loss or sagging voltage, and did not receive a clear to close message; and closing the fault interrupting device after the load side switching device has opened.

17. The system according to claim 16 further comprising closing a normally open switching device after the load side and the source side switching devices have opened.

18. The system according to claim 16 wherein sending the messages includes sending the messages on the power line.

19. The system according to claim 16 wherein the power distribution network is part of an underground power distribution network and the electrical devices are transformers.

20. The system according to claim 16 wherein the switching devices are vacuum interrupters.

\* \* \* \* \*